United States Patent
Judlowe et al.

[19]

[11] Patent Number: 6,159,513
[45] Date of Patent: Dec. 12, 2000

[54] PACKAGE AND METHOD FOR PACKAGING AND PREPARING A MIXED DRINK

[75] Inventors: Michael Judlowe, New York, N.Y.; Denise Lefebvre, Southbury, Conn.

[73] Assignee: Mott's, Inc., Stamford, Conn.

[21] Appl. No.: 09/321,388

[22] Filed: May 27, 1999

[51] Int. Cl.[7] .................................................. B65D 85/816
[52] U.S. Cl. .......................... 426/115; 426/112; 426/394; 426/590; 426/592; 220/568; 366/130
[58] Field of Search ..................................... 426/115, 112, 426/590, 592, 86, 394; 7/300.1; 220/568; 366/130; 222/565

[56] References Cited

U.S. PATENT DOCUMENTS

| | | | |
|---|---|---|---|
| 1,740,223 | 12/1929 | Burvenick . | |
| 1,744,328 | 1/1930 | Morley . | |
| 2,684,167 | 7/1954 | Bruns . | |
| 2,695,732 | 11/1954 | Tupper | 222/189.02 |
| 3,779,372 | 12/1973 | de Lloret | 206/47 A |
| 3,820,692 | 6/1974 | Swett et al. | 222/547 |
| 4,408,690 | 10/1983 | Ferrero | 206/222 |
| 4,634,003 | 1/1987 | Ueda et al. | 206/221 |
| 5,547,275 | 8/1996 | Lillelund et al. | 366/130 |
| 5,551,608 | 9/1996 | Moore et al. | 222/542 |
| 5,609,899 | 3/1997 | Spector | 426/111 |
| 5,641,084 | 6/1997 | Rice | 215/246 |
| 5,731,021 | 3/1998 | Spector | 426/111 |
| 5,772,017 | 6/1998 | Kang | 206/222 |

*Primary Examiner*—Gabrielle Brouillette
*Assistant Examiner*—Robert Madsen
*Attorney, Agent, or Firm*—Pennie & Edmonds LLP

[57] ABSTRACT

A method of packaging and preparing a mixed drink and the mixed drink mixer package therefor, wherein pre-measured mixer ingredients are packaged in a container that is marketed and sold with extra head-space for the subsequent addition and shaking of ingredients according to the consumer's taste, and preferably with a strainer for straining the mixed drink prior to serving. The consumer may prepare the drink by adding an alcoholic beverage and, if desired, ice through the wide opening of the container. Blending of the ingredients may be accomplished by shaking the container, which is provided with a removable, leak-proof cap. The ingredients may be strained through the detachable strainer when they are poured from the container, or the container itself may be used as a drinking vessel, thus minimizing the time, effort, and inconvenience of amassing a variety of containers and implements that are associated with prior art methods of packaging the ingredients for mixed drinks and preparing mixed drinks.

19 Claims, 2 Drawing Sheets

PACKAGE AND METHOD FOR PACKAGING AND PREPARING A MIXED DRINK

FIELD OF THE INVENTION

The present invention relates to packages and methods for packaging and preparing beverages, and in particular to a package and method for packaging and preparing a mixed drink.

BACKGROUND OF THE INVENTION

Many beverages are prepared and consumed as mixed drinks, i.e., drinks that are prepared by mixing together two or more ingredients just before serving or consuming. The ingredients of such beverages typically are not combined until the drink is prepared, for a variety of reasons. For one thing, keeping the ingredients separate prevents them from interacting with each other and thereby spoiling taste and freshness. Also, if a drink is mixed just before consumption, it can be made with ingredients and proportions that are preferred by the consumer.

Because the ingredients of a mixed drink are stored separately before preparation, a number of containers and implements are typically needed in order to prepare such a drink. For a mixed alcoholic beverage such as a cocktail, for example, typical ingredients include at least a mixing base of alcohol such as gin, whiskey, rum, or the like; and tonic water, carbonated water, ginger ale, fruit juice or some other nonalcoholic beverage that is to be mixed with the alcohol base; as well as ice. Aside from the glass or plastic bottles, metal cans or other containers that are used to store such ingredients, the mixed drink often is mixed in a cocktail shaker bottle for mixing and straining the ingredients just before serving. Other implements such as bottle openers, can openers, stirrers or measuring cups may also be needed. The drink is often poured through a strainer into a drinking glass before serving. Preparing an alcoholic or non-alcoholic mixed drink can be a time-consuming, messy and inconvenient process when a number of containers, ingredients and implements are used. Poured liquids tend to spill easily, thus requiring clean-up. Furthermore, it can be difficult to store, move, and/or set up the ingredients, drinking glasses and other implements that are needed to prepare mixed drinks for a party, picnic or other social setting for which such drinks are often served. Many of these items are made of or stored in glass, which can break easily in such settings.

A number of attempts have been made to reduce the need for plural containers and implements and/or to simplify the process of preparing mixed drinks. For example, U.S. Pat. No. 1,774,328 provides a transparent cocktail shaker bottle that can hold a formula strip in a vertical depression on the outside surface of the shaker container. When the formula strip is vertically aligned on the shaker, it indicates to what level one should pour specific ingredients, such as sweetener, fruit juice, alcohol and ice. That invention simplifies preparation of a mixed drink by eliminating the need for separate measuring implements, and the invention enables one to prepare a variety of cocktails with consistent results by following the formulas that are set forth on the formula strips. Inventions such as disclosed in U.S. Pat. No. 1,774,328, however, do not substantially decrease the number of containers that are needed to package individual ingredients or to prepare a mixed drink therefrom.

More recently, attempts have been made to package separate ingredients into two separate chambers of a single container. Because the ingredients are kept separate, they are prevented from reacting with each other and spoiling or adversely affecting flavor while they are transported, marketed and stored prior to consumption. The container typically has a large, lower chamber filled with a first ingredient, such as soda or tonic water, and a smaller, upper chamber for holding a second ingredient, such as an alcoholic beverage or a powder that effervesces when it is combined with the first ingredient. Means are provided for puncturing, breaking or otherwise opening the upper chamber so that its contents fall into the ingredient in the lower chamber. The small upper chamber may be discarded so that the consumer may drink out of the lower chamber, as in U.S. Pat. No. 4,634,004 or U.S. Pat. No. 3,779,372. Alternatively, the upper part of the container may be adapted for insertion of a straw, as taught in U.S. Pat. Nos. 5,772,017 and 4,408,690.

Methods of packaging and preparing mixed drinks such as the dual-chambered containers described above suffer a number of drawbacks, such as the fact that the packaging tends to be complex, expensive, and typically not reusable or recyclable. In addition, the consumer's choice of mixing ingredients is limited by the combinations that are packaged and sold together. Furthermore, when a dual-chambered container is used, the contents are not guaranteed to mix together adequately when the ingredient in the upper chamber merely falls down into the liquid in the lower chamber. When the upper chamber is not removable, the opening in the top of the container may be too small to add ice cubes or crushed ice, which can contribute substantially to the appeal of the mixed drink. When the upper chamber of a dual-chambered container is removable, ice can be added, but means are typically not provided for re-closing the container and shaking the mixture. Shaking is frequently desirable when a mixed drink is prepared, because it enhances the blending of flavors and, when ice is used, the shaking process causes bits of ice to fleck off into the drink and render it icy cold. Because adding ice and/or shaking ingredients are part of the concept and appeal of making a mixed drink, dual-chambered containers tend not to be well-adapted for packaging or preparing mixed drinks.

Thus, there is a need for a method of packaging and preparing a mixed drink that offers simplicity, low expense, ease of use, a minimum of implements for preparing the drink, and flexibility and appeal to the consumer who wishes to add his or her preferred mixing base, such as liquor or a non-alcoholic beverage.

SUMMARY OF THE INVENTION

The invention comprises a method of packaging and preparing a mixed drink, and a mixed drink mixer package appropriate for use according to the method of the invention, wherein the mixed drink is preferably made with alcohol. The preferred method of packaging and preparing a mixed drink comprises several steps, including: (a) providing a drink container having a predetermined volume with a removable fluid tight cap; (b) pre-filling the container to a predetermined level with a first drink ingredient, wherein the predetermined level provides an empty head space within the container above the first ingredient, wherein the head space volume is approximately equal to a desired volume of additional ingredients to be added to the container according to a recipe to complete the mixed drink; (c) adhering a tamper-evident seal to an opening on said container; (d) applying a removable strainer to the opening on which said seal is adhered; (e) applying the fluid tight cap to close said container; (f) subsequently removing the cap, strainer and tamper-evident seal; (g) filling said head space with at least a second ingredient according to the recipe to complete the mixed drink; (h) again applying the strainer to the opening and applying the fluid tight cap to close the container; (i) shaking the container to mix the contents; and (j) removing the fluid tight cap to dispense the mixed drink through the strainer.

The invention also includes a mixed drink mixer package that is preferably used according to the method of the invention. The package comprises a container that has an opening and a predetermined volume. It also has a removable, fluid-tight cap for closing the container opening and is provided with a safety seal for sealing the cap to the container. After purchase, the consumer may remove and discard the safety seal. The safety seal may be either a frangible member that surrounds the cap, such as a clear plastic, removable safety seal or other type of safety seal as is well known in the art. Alternatively, the seal may be a membrane such as a foil-backed heat-induction seal or tamper evident seal that is applied to the opening of the bottle with a heat-induction process or other process known in the art. Preferably, the seal is an air-tight seal that is removably attached to the opening of the container body or to the strainer to keep fluids or powdered solids from seeping into or out of the container during transportation or storage.

A predetermined amount of a first drink ingredient is sealed within the container, wherein the first drink ingredient is one of at least two ingredients making up a drink recipe to be mixed in the container. An empty head space volume is provided within the container above the predetermined amount of the first drink ingredient. The volume occupied by the head space is approximately equal to the volume of at least a second drink ingredient, such as alcohol, that is to be placed in the container by the consumer. Because the container opening is relatively large, it can accommodate ice, such as ice cubes or crushed ice, as a second ingredient.

Preferably, the method of preparing a mixed drink includes providing the container with a strainer that is releasably attached to the opening of the container. The strainer is designed to be pulled off the container body and put back on again with finger pressure. The strainer may be removed to allow a preparer to pour additional ingredients and ice into the container body, and the strainer may be fitted back onto the opening so that ingredients may be poured therethrough, preferably after the mixture has been shaken, into a drinking glass or vessel.

According to the invention, the package has a container body shape that is configured and adapted for shaking and mixing ingredients prior to serving. Preferably, the container body is made of a polymeric material that is suitable for holding and storing liquid and/or food ingredients.

The removable cap is adapted to close the opening of the container with an air-tight fit and is made of a suitable material such as, for example, metal or plastic. It may be provided with internal threads to engage external threads that are provided on the neck of the container body. Alternatively, the cap may be fitted with a snap fit or interference fit on the neck of the container body. The cap is preferably capable of closing the opening of the container body when a strainer and leak-proof seal are mounted thereupon.

DETAILED DESCRIPTION OF THE PREFERRED EMBODIMENTS

Figure 1:
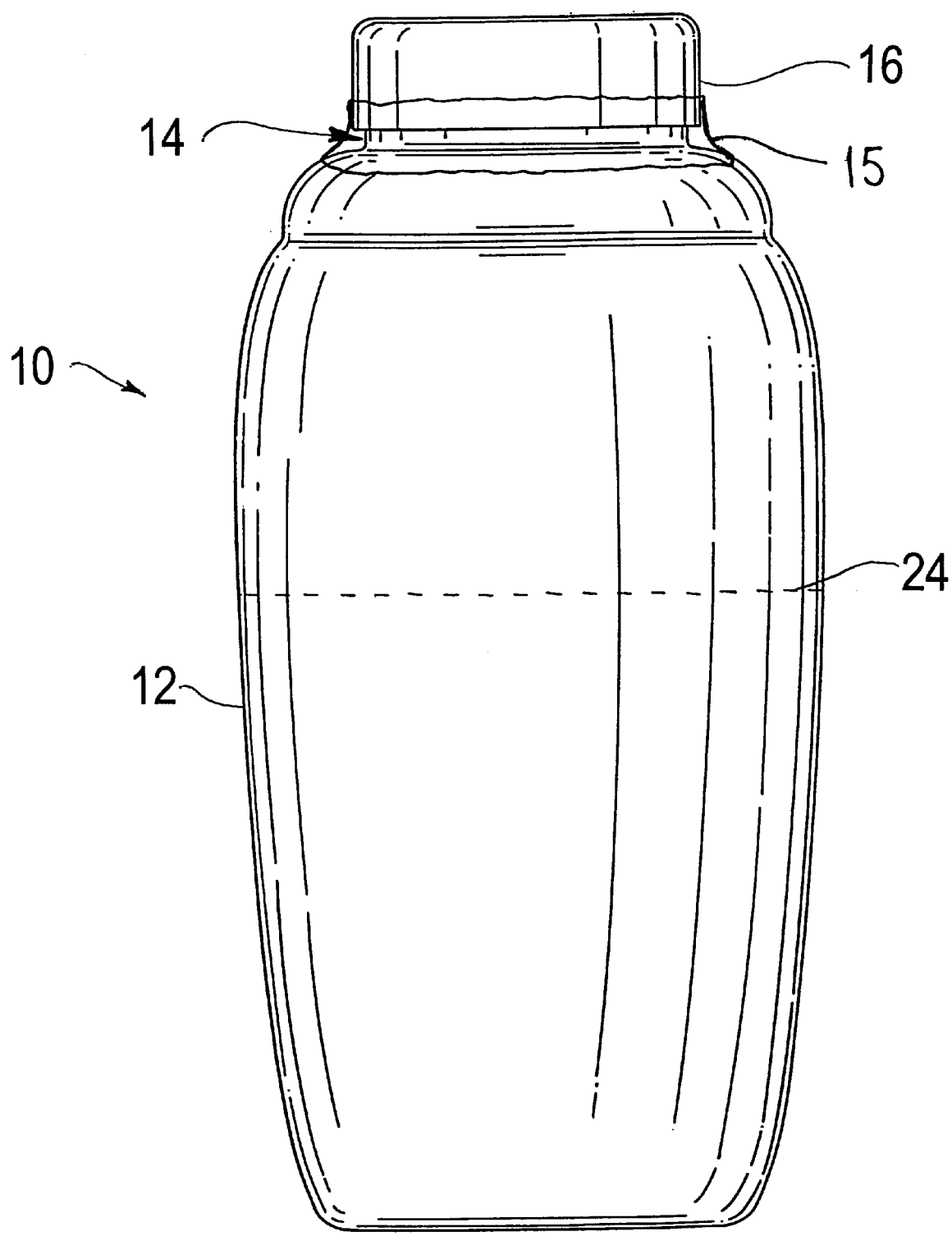
FIG. 1 is an elevational view of a package according to preferred embodiments of the package and method of packaging and preparing a mixed drink according to the invention.

The invention includes methods for packaging a mixed drink and a package for mixed drinks such as shown in FIG. 1. A further aspect of the invention, in conjunction with the packaging, is a method of preparing a mixed drink using ingredients that have been pre-packaged in a container such as container 10 shown in FIG. 1.

The method of packaging a mixed drink includes pre-measuring ingredients and putting them in a container that is sized and shaped to hold the pre-measured ingredients and have excess volume or "head-space" left over to accept the subsequent addition of ingredients such as ice, liquor, water or juice, etc. Packaging thus involves partially filling or short-filling the container with pre-measured ingredients, which are typically in liquid form, such as for example, a flavorful drink mixture. As a result, the partially filled container package 10 has a low center of gravity, which reduces any tendency of the container to tip or spill its contents on a production line.

Figure 2:
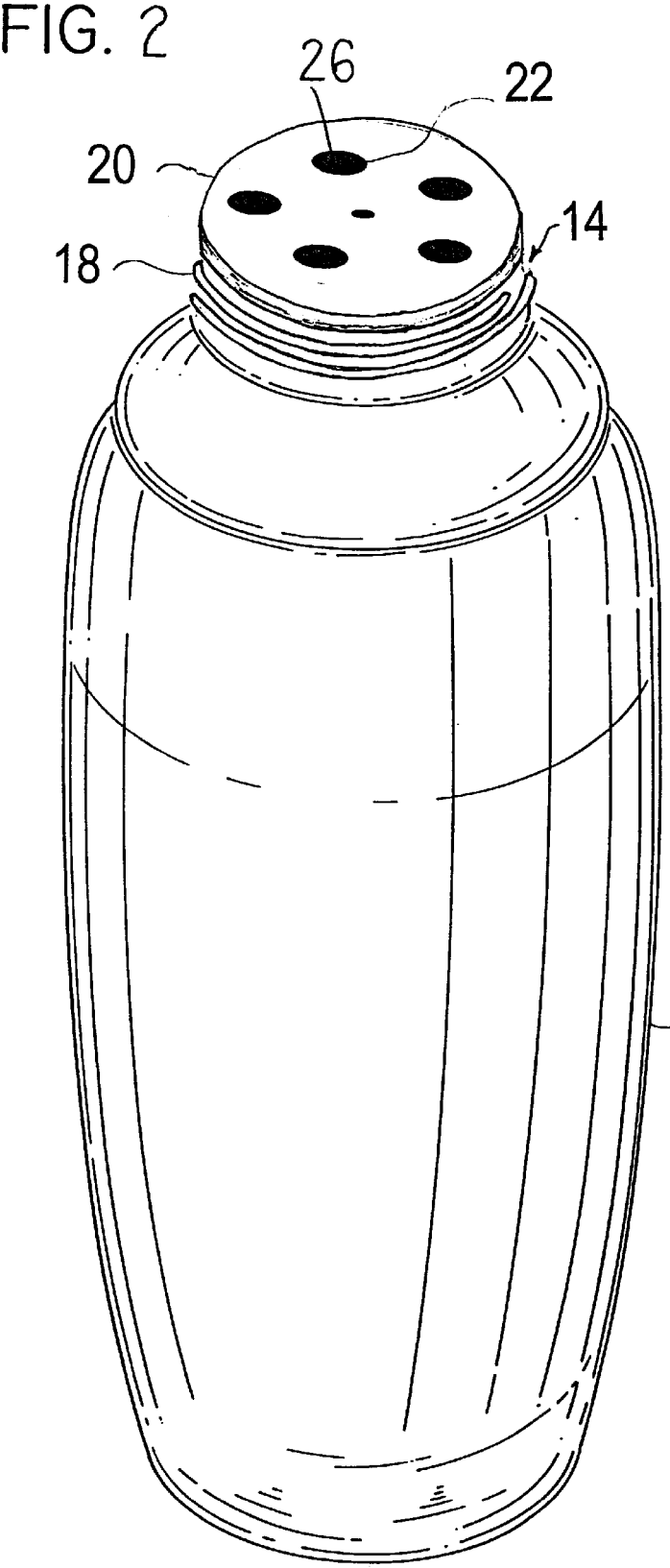
FIG. 2 is a perspective view of the container body and strainer used in preferred embodiment of the present invention.
Figure 3:
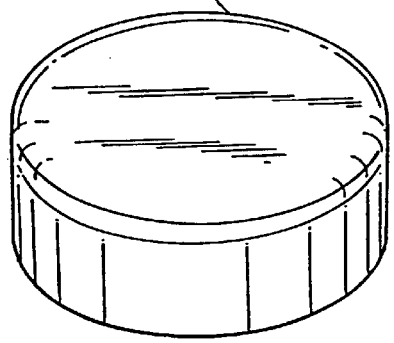
FIG. 3 is a perspective view of a preferred embodiment of the reusable cap used with the container of FIG. 2.

Container body 12, shown in FIGS. 1 and 2, may be made of a variety of materials, such as, for example, plastic or glass. Preferably, it is made of a polymeric material such as polyethylene, which is lightweight, chemically resistant, relatively inexpensive, relatively easy to form into shapes that are attractive to the consumer, and resistant to breakage.

A wide neck 14 in container body 12 has an opening that is adapted to receive a removable cap 16. Preferably, neck 14 provides an opening of sufficient size to accommodate standard size ice cubes, i.e., at least about 1⅜ inches in diameter. Cap 16 may be made of any suitable material or materials, such as plastic or metal, for example. It is configured to close and seal the opening of container body 12 and be removable and reusable by the consumer. Preferably, cap 16 has internal threads that are capable of engaging external threads 18 that are preferably provided on container body neck 14. The threaded engagement is intended to render the container leak-proof when the cap is tightened, but since the cap is removable and replaceable, it allows the container to be reused. Alternatively, the cap may be configured and adapted to snap on and off container body neck 14. According to a preferred embodiment, before initially opened by the consumer, container 12 also has a consumer removable safety seal 15 which surrounds the cap, particularly where the lower edge of the cap receives neck 14 of container 12, and seals the cap to the container.

Preferably, container body 12 is provided with a strainer 20 that is adapted to fit onto the opening of the container so that a drink that is mixed therein can be strained as it is poured into a serving glass. The preferred strainer 20 has holes or openings 22 in it that keep solid objects such as ice cubes or pieces of fruit from falling out of container body 12 when liquid ingredients are poured therefrom. Preferably, strainer 20 is a removable plastic disk with more than one hole in it, wherein the disk may be snapped onto the mouth of container body 12, and wherein the disk may be snapped off by pulling it with finger pressure. When strainer 20 is pulled off, a desired amount of alcohol may be added by the consumer. There is sufficient space within container body 12 for the addition of even more ingredients including ice, for example, because the method of packaging the mixed drink includes partially filling container body 12 with a pre-measured ingredient or combination of ingredients prior to distribution of package 10. Partial filling results in a pre-measured fluid level that does not reach the top of container body 12 but instead reaches a fluid line such as, for example, line 24, shown in FIG. 1.

The opening of container body 12 is also preferably provided with an air-tight seal 26 that is configured and adapted to maintain freshness of the packaged, flavorful ingredients during transport, while the product is displayed for sale, and when the container is stored before consumption. Seal 26 can be made of a suitable material such as foil-backed paper or plastic and is preferably a circle of barrier material or liquid-proof material that may be applied to the opening of container body 12 by a heat induction process, which is well known in the art. Seal 26 provides an air-tight, tamper evident closure for container 12, and seal 26 is preferably removably applied or adhered to the mouth of container 12 before the strainer is mounted thereon (visible through openings 22 in FIG. 2). The seal is intended to keep air and/or liquid or solid materials from seeping into or out of the container.

Because package 10 has simple, smooth lines and shapes, it may be marketed in mass quantities at a reasonably low cost, and it is suitable for displaying advertising material and other types of labeling, such as instructions for adding ingredients such as an alcoholic mixing base to the consumer's taste. The container is also preferably recyclable and may be reused to store other ingredients, or it may be used or reused as a convenient container for mixing and/or drinking non-alcoholic beverages.

A method of packaging a mixed drink according to the present invention thus includes pre-packaging a flavorful, pre-measured ingredient or mixture of ingredients into a container that is marketed and sold with extra head-space for the consumer to add alcohol, ice or other ingredients if desired, wherein the container may be used as a shaker bottle and/or strainer. The container is even suitable for use as a drinking vessel. The invention therefore provides a method of packaging the ingredients that are desired for a mixed drink, to which ice may be added. Alternatively, the method of packaging provides all the ingredients for making a mixed drink recipe except for alcohol, which may be added as desired by the preparer or consumer. The package is preferably marked and/or labeled to indicate that additional ingredients may be added to the contents, such as ice or alcohol, and optionally some other beverage and/or garnish, to customize the drink according to the consumer's taste. Because the mixture can be combined and shaken in the packaging, the number of containers and implements that are needed to make the mixed drink is substantially reduced, thus minimizing the time, effort and inconvenience that are associated with prior art methods of packaging the ingredients for mixed beverages. The ease and enjoyment of selecting, preparing, serving and consuming a mixed drink that is packaged according to the inventive method are thereby enhanced.

Additionally, the invention includes a method of preparing a mixed drink, which also involves the use of container 10, wherein pre-measured ingredients are packaged, sealed, marketed, sold and stored in a container that is adapted for use as a shaker and strainer and optionally for use as a drinking vessel. The preparer or consumer prepares the drink by first selecting one of a variety of flavored mixes that have been packaged as described above in container 10. After removing cap 16, breaking the optional seal and removing strainer 20, the preparer may add the consumer's preferred choice of either ice or alcohol, such as gin, whiskey, rum or the like. Additional ingredients may also be added to the mixture, such as fruit juice, water or the like. Because the mouth of the container is wide, it can accommodate the addition of ingredients that are solid, such as ice cubes, crushed ice, pieces of fruit or other garnishes.

After putting cap 16 and optional strainer 20 back on, preferably by snapping strainer 20 onto the opening of container body 12 and screwing cap 16 over it to minimize leakage, the container may be shaken up and down or back and forth to mix the ingredients therein. Mixing is easily accomplished because the container is intended to be essentially spill-proof, light-weight, and easily held in one or both hands. The mixing process can enhance the flavor and appeal of the mixed drink by blending the ingredients, adding a foamy texture, and, if ice has been added, cooling the drink to an icy temperature.

Alternatively, if carbonated soda has been added, it may preferable not to shake the ingredients, since shaking a carbonated liquid tends to cause foaming, which can cause the mixture to expand and overflow, especially when the cap is loosened.

The user may then remove the cap and pour the mixed drink directly out of the container into a drinking glass, or if strainer 20 has been mounted on the container body opening, the user may strain the drink through strainer 20, which preferably is adapted to snap onto the opening or mouth of container body 12. Straining the drink can keep any solid objects such as ice cubes or fruit slices from falling out of container body 12 when it is tipped over for pouring. Additionally, strainer 20 can cause gentle intermixing of the ingredients when they are poured from container body 12 and through the strainer into a serving glass. Alternatively, a straw may be inserted in the container body opening or through one of the holes in strainer 20 to enable the consumer to sip the drink from the container through a straw. Or, strainer 20 may be removed so that the consumer may drink directly from container body 12. This way of drinking the beverage eliminates the need for a separate drinking glass, which is convenient when the drink is consumed at, for example, an outdoor event or gathering where extra serving implements are not handy.

The invention is further illustrated by way of the following examples, which are not intended to specifically limit the invention:

EXAMPLE 1

In this example, container 12 is a twenty-two fluid ounce container which is pre-filled with twelve ounces of non-alcoholic drink mix flavored to taste like a "bloody mary" when mixed with the correct alcohol amount. An empty head space of approximately ten fluid ounces is thus left above the drink mix in the container. After pre-filling of the drink mix, seal 26 is applied to seal the mouth of the container on neck 14. Strainer 20 is then snap fit over seal 26 and finally cap 16 is threaded on to neck 14. A safety seal such as shrink wrap is applied around cap 16 and neck 14.

Upon receiving pre-filled container 12, the consumer removes cap 16, strainer 20 and seal 26. The consumer is instructed via the package labeling to fill the empty head space of the container with vodka and ice. While the consumer has some leeway in the alcohol/mixer proportions, the ten-ounce head space volume is selected to prevent the drink from being made with excess alcohol, thus compromising the flavor. After adding vodka and ice, strainer 20 is replaced and cap 16 screwed on. The container is shaken and is thus ready for consumption either directly from the container or by being poured through the strainer.

EXAMPLE 2

Container 12 may be a twenty-two fluid ounce container, for example, that is pre-filled with eighteen ounces of a drink mixed and flavored to taste like a drink commonly known as a "cosmopolitan", a red-colored, citrus flavored drink which includes vodka. An empty head space of approximately four fluid ounces is left after partially filling the container with the drink mix. Thus, according to this example, the only additional ingredients to be added is ice. Seal 26 is applied to the opening of container 12 by a heat induction process to adhere it to the opening and provide an air-tight, tamper proof closure.

The heat induction process nevertheless enables the seal to be removed by the preparer or consumer at a subsequent time prior to consumption of the drink. Strainer 20 is then snap fit onto the mouth of partially filled container 12 on neck 14 over seal 26. Cap 16 is threaded onto neck 14 over strainer 20 and seal 26.

To prepare a mixed drink for consumption after selecting package 10, the preparer unscrews cap 16 and pulls strainer 20 off the mouth of partially filled container 12. Seal 26 is removed from the opening of container 12 with finger pressure. In this example, instructions on the package or package labeling advise the preparer to add ice cubes or cracked ice. The preparer adds the ice directly to the pre-packaged mixed drink in container 12, wherein the available head space prevents the preparer from adding excess ice and thereby compromising flavor and appearance. Cap 16 is secured onto the mouth of container 12, which is then shaken until the contents are mixed to the preparer's satisfaction. Cap 16 is removed, and strainer 26 is replaced onto the mouth of container 12 so that the contents may be poured through the strainer into a drinking vessel. Alternatively, the consumer may drink directly out of container 12 or may insert a straw therein for drinking through the straw. The strainer is configured with holes, at least one of which is large enough to enable a straw to be inserted therethrough, to alternatively allow a consumer to sip the mixed drink through a straw when the strainer is attached to the mouth of container 12.

The inventive method of preparing a mixed drink thus eliminates the need for separate implements and containers for measuring, straining, stirring and/or shaking ingredients. Furthermore, since the majority of ingredients are pre-packaged in multi-purpose container 10 and are marketed, sold and stored therein, the preparer does not need an assortment of different ingredients to prepare the mixed drink. Thus, the process of preparing the drink is greatly simplified, because the storage, transport, set-up and clean-up of additional ingredients, containers and implements is virtually eliminated.

What is claimed is:

1. A method of packaging and preparing a mixed drink, comprising
    providing a drink container having a predetermined volume with an opening and a removable fluid tight cap;
    pre-filling the container to a predetermined level with at least a first liquid drink ingredient, wherein said predetermined level provides an empty head space within said container above said first liquid drink ingredient having a head space volume approximately equal to a desired volume of additional ingredients to be added to the container according to a recipe to complete said mixed drink;
    placing a fluid-tight seal on the opening of said container while maintaining said head space volume applying a removable strainer to the container opening over said fluid-tight seal;
    applying the fluid tight cap to close said container;
    applying a consumer removable safety seal to the container while maintaining said head space volume;
    subsequently removing the cap, strainer fluid tight seal and safety seal and then filling said head space with at least a second ingredient according to the recipe to complete the mixed drink;
    optionally reapplying the strainer;
    again applying the fluid tight cap to close the container;
    shaking the container to mix the contents; and
    removing the fluid tight cap to dispense the mixed drink.

2. The method according to claim 1, wherein the fluid-tight seal is a tamper-evident seal adhered across the opening of said container.

3. The method according to claim 2 wherein the steps of placing a fluid-tight seal and applying a consumer removable safety seal are accomplished at once by adhering a tamper-evident seal across the opening of the said container.

4. The method according to claim 1, wherein said at least a second ingredient comprises alcohol.

5. The method according to claim 1, wherein said at least a second ingredient comprises ice.

6. A mixed drink mixer package, comprising:
    a container having an opening of sufficient diameter to receive a standard ice cube and a predetermined volume;
    a removable strainer removably attached to said container opening;
    a removable, fluid tight cap closing said container opening over said removable strainer;
    a consumer removable safety seal at said opening;
    a predetermined amount of a first liquid drink ingredient for a mixed drink sealed within said container, said first liquid drink ingredient being one of at least two ingredients making up a drink recipe to be mixed in said container, said predetermined amount providing an empty head space volume within said container above said first liquid drink ingredient, wherein the head space volume is approximately equal to the volume of at least a second drink ingredient to be placed in the container by a consumer.

7. The mixer package according to claim 6, wherein the consumer removable safety seal comprises a tamper-evident seal adhered across the container opening.

8. The mixer package according to claim 6, wherein the consumer removable safety seal is a frangible member surrounding the removable cap.

9. A method of packaging and preparing a mixed drink, comprising the steps of:
    pre-measuring at least a first liquid mixture ingredient for the mixed drink;
    partially filling a package with said first liquid mixture ingredient, wherein the package comprises a container body that is configured and adapted to hold and store food in liquid or solid form, an opening in said container body that is configured and adapted for pouring food into and out of the container body, a removable strainer attachable to said opening, and a reusable cap for closing the opening; and wherein the container body has an interior space that is not filled completely after the container body is partially filled with the first liquid mixture ingredient, and wherein the part of the interior space that is not filled is suitable for the subsequent addition of at least a second ingredient;

closing the package by applying the strainer and cap to the opening of the container while said part of the interior space remains unfilled;

sealing the package by applying a frangible member around the cap;

marking the packaging with instructions to add at least a second ingredient to the package;

subsequently removing the frangible member, cap and strainer; and adding at least one second ingredient to the unfilled interior space in the package prior to consumption.

10. The method according to claim 9, wherein the package is configured and adapted for shaking and mixing ingredients prior to serving.

11. The method according to claim 9, wherein the package is made of a polymeric material.

12. The method according to claim 9, further comprising the steps of:

applying the strainer to the opening of said container;

applying the cap to close the opening of said container over said strainer;

shaking the container to mix the contents; and removing the cap to dispense the mixed drink through the strainer.

13. The method according to claim 9, wherein the package further comprises a tamper-evident seal that is removably adhered to the opening of said container body before the strainer is applied to said opening.

14. The method according to claim 9, wherein the container body neck has external threads thereon and wherein the cap has internal threads for engaging the external threads on the container body neck.

15. The method according to claim 9, wherein the cap is configured and adapted for snapping on and off the container body neck.

16. The method according to claim 9, wherein the cap is releasably mounted for a leak-proof fit upon said strainer.

17. The method according to claim 9, wherein the first liquid mixture ingredient is a combination of flavorful liquids suitable for making a mixed drink.

18. The method according to claim 9, further comprising the steps of:

replacing the cap after adding at least a second ingredient to the package;

shaking the container to mix the ingredients together; and removing the cap to dispense the mixed ingredients.

19. A method of packaging and preparing a mixed drink, comprising the steps of:

providing a package that is partially filled with a first liquid mixture ingredient, wherein the package comprises a container body that is configured and adapted to hold and store food in liquid or solid form, an opening in said container body that is configured and adapted for pouring food into and out of the container body, a strainer that is releasably attached to the opening of said container body, and a reusable cap for closing the opening, wherein the reusable cap is configured to fit over the strainer, and wherein the container body has a fillable space left over after the package is partially filled with the first liquid mixture ingredient, said fillable space being suitable for the subsequent addition of at least a second ingredient;

removing the cap and the strainer from the opening;

adding at least one second ingredient to the package;

replacing the strainer and the cap to close the opening;

shaking the container to mix the ingredients;

removing the cap; and pouring the mixed ingredients out of the container body through the strainer and into a drinking vessel.

* * * * *

UNITED STATES PATENT AND TRADEMARK OFFICE
CERTIFICATE OF CORRECTION

PATENT NO. : 6,159,513
DATED : December 12, 2000
INVENTOR(S) : Michael Judlowe and Denise Lefebvre It is certified that error appears in the above-identified patent and that said Letters Patent is hereby corrected as shown below:

Column 1,
Line 50, replace "1,774,328" with -- 1,744,328 --.
Line 61, replace "1,774,328" with -- 1,744,328 --.

Column 7,
Line 67, insert a semicolon after "volume".

Column 8,
Line 6, insert a comma after "strainer".

Signed and Sealed this

Fourteenth Day of February, 2006

JON W. DUDAS
*Director of the United States Patent and Trademark Office*